United States Patent [19]

Boville et al.

[11] Patent Number: 5,605,424
[45] Date of Patent: Feb. 25, 1997

[54] TWO-PART FASTENING SYSTEM

[75] Inventors: Daniel Boville, Paris; Bernard Houte, Meylan, both of France

[73] Assignee: A. Raymond & CIE, Grenoble, France

[21] Appl. No.: 511,136

[22] Filed: Aug. 4, 1995

[30] Foreign Application Priority Data

Aug. 5, 1994 [DE] Germany .......................... 44 27 723.7

[51] Int. Cl.$^6$ .......................... F16B 21/00; F16B 21/18; F16D 9/00; F16G 11/00
[52] U.S. Cl. .......................... 411/522; 411/437; 411/553; 403/2; 403/282; 403/298; 403/348
[58] Field of Search ..................... 411/437, 551, 411/552, 553, 522, 520, 516; 403/2, 282, 298, 348

[56] References Cited

U.S. PATENT DOCUMENTS

| 3,297,916 | 1/1967 | Wright | 411/522 X |
| 4,067,256 | 1/1978 | Turner | 411/437 |
| 4,299,520 | 11/1981 | Iwata | 411/437 |
| 4,770,582 | 9/1988 | Junemann et al. | |

FOREIGN PATENT DOCUMENTS

| 121380 | 5/1946 | Australia | 411/522 |

*Primary Examiner*—Neill R. Wilson
*Attorney, Agent, or Firm*—Gifford, Krass, Groh, Sprinkle, Patmore, Anderson & Citkowski, P.C.

[57] ABSTRACT

A two-part fastening system composed of an anchoring part (1) which is pressed into a fastening body (4) of hard-elastic synthetic material. The anchoring part (1) consists of a relatively soft synthetic material and is provided with a plurality of parallel ribs extending perpendicularly from a carrier plate 2. The fastening body (4) includes a pair of clamping walls (5) having several rows of pointed projections (9) spaced one over another. The ribs of the anchoring part are pressed into engagement with the pointed projections so that a high strength connection between the parts is generated.

8 Claims, 3 Drawing Sheets

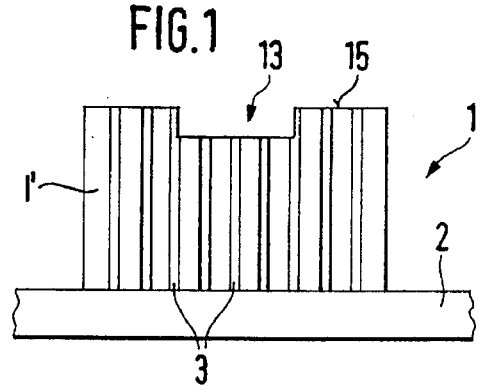
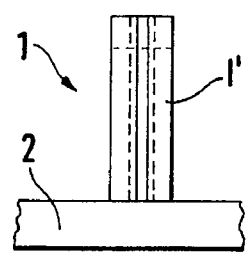
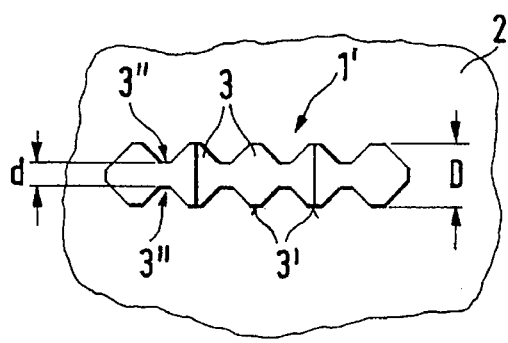
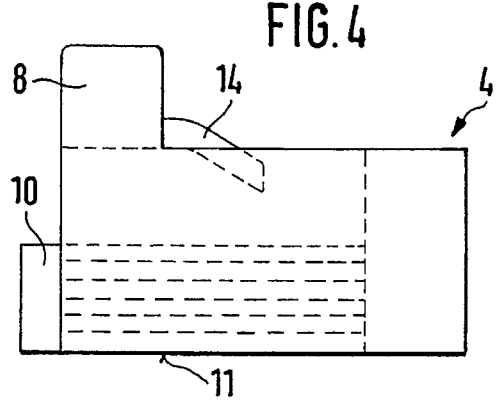
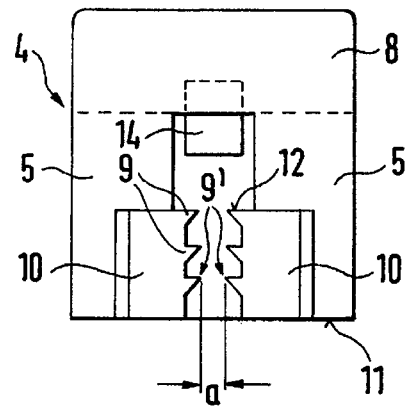
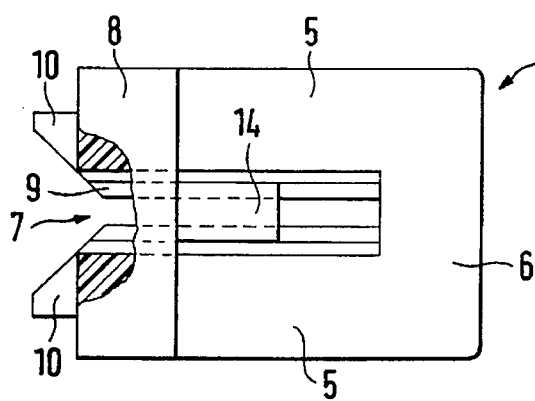

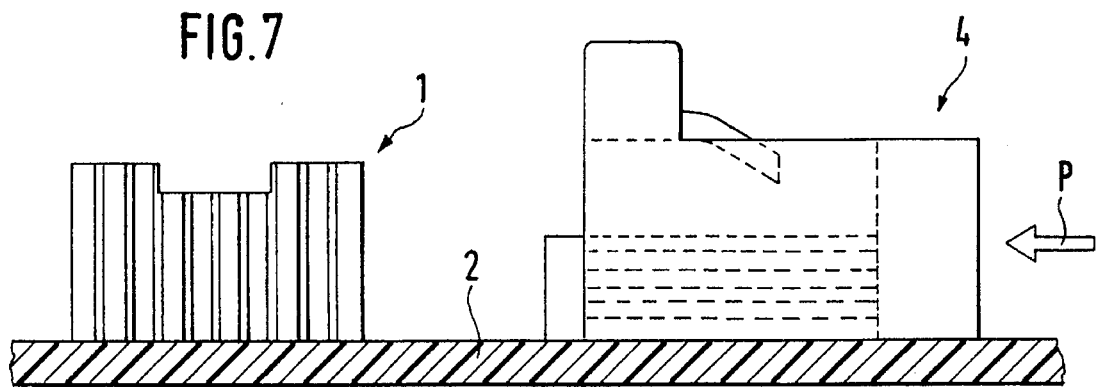
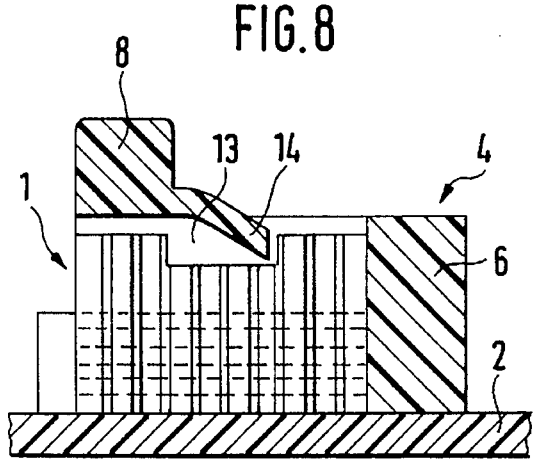
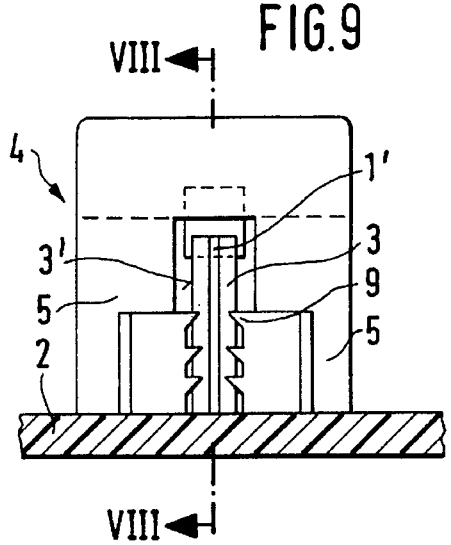
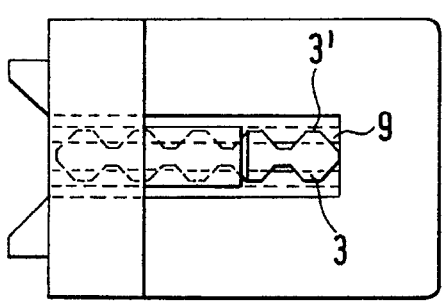

TWO-PART FASTENING SYSTEM

BACKGROUND OF THE INVENTION

I. Field of the Invention

The present invention relates to a two-part fastening system, consisting of an anchoring part having a support plate and a fastening part which is provided with elastically deformable clamping walls which may be pressed onto the anchoring part.

II. Description of the Prior Art

Two-part fastening systems which may be pressed together are known, such as the system disclosed in German Patent DE 34 06 934 Cl. This fastening system includes a holding part for securing an object and a nut-like fastening part. The holding part has a threaded pin and the fastening part has a plurality of smooth resilient clamping walls. The clamping walls are pressed on to the threaded pin to slide over the pins of the holding part. Once in place, the edges of the threads of the pin cut into the clamping walls slightly to provide a generally secure connection. The threaded pin may be removed from the fastening part by unscrewing the pin from the holding part.

It is possible to produce holding parts with anchoring portions, such as T-bolts or threaded pins, with a plastic carrier or support plate. In order to injection mold the holding parts with the support plate in one operation, it is necessary to use relatively complicated and expensive injection molding machines. However, the performance of such machines is below that of those using simple casting molds which permit removal of the part on one plane. Alternatively, it is possible to use casting molds for injection molding the anchoring parts.

Another solution lies in casting the support plates without the anchoring parts and fastening the anchoring parts to the carrier in a second operation, for example by cementing, friction welding, or interference fit. This solution has the disadvantage that the anchoring parts have to be manufactured separately and mounting the assembly to the carrier requires extra resources and additional time, which results in substantial additional costs.

Thus, an object of the invention is to form a fastening body with an associated anchoring part in such a manner that both can be economically injected and removed from the mold without problems. A further object of the invention is to design the cooperating fastening member in such a way as to provide stronger holding forces between the parts.

These objects are achieved in a simple manner by providing a fastening member having a pair of clamping walls having sharp, pointed projections which engage a plurality of ribs formed on an anchoring member. This arrangement provides a large increase in the holding forces.

A first preferred embodiment of the invention includes an anchoring part having a webbed plate onto which a fastening body is pressed. The fastening body has two parallel clamping walls with sharp, pointed projections which securely lock the two parts together.

Also disclosed is an alternative preferred embodiment of the invention including an anchoring part in the form of a ribbed bolt and a fastening member having a sleeve having sharp, pointed circumferential projections in two diametrically opposed regions. The sleeve is first pressed axially onto the bolt and then the projections and ribs are brought into engagement by rotation of one part a quarter turn relative to the other part.

DESCRIPTION OF THE DRAWINGS

The aforementioned embodiments of the invention are to be explained in the following detailed description with reference to the appended drawings.

FIG. 1 is a side elevation of an anchoring part of a first preferred embodiment of the invention;

FIG. 2 is a partial front elevation of the anchoring part according to the first preferred embodiment of the invention;

FIG. 3 is a partial plan view of the anchoring part according to the first preferred embodiment of the invention;

FIG. 4 is a side elevation of a fastening body according to the first preferred embodiment of the invention;

FIG. 5 is a front elevational view of the fastening body showing an entry opening according to the first preferred embodiment of the invention;

FIG. 6 is a plan view of the fastening body according to the first preferred embodiment of the invention;

FIG. 7 is a side view of the fastening body in position for assembly with the anchoring part prior to impression of the fastening body on the webbed plate according to the first preferred embodiment of the invention;

FIG. 8 is a sectional view of the fastening body after the impression onto the webbed plate taken along line VIII—VIII of FIG. 9;

FIG. 9 is a front elevation of the anchoring part and fastening body after assembly;

FIG. 10 is a plan view of the anchoring part and fastening body after assembly;

DETAILED DESCRIPTION OF THE PREFERRED EMBODIMENTS

Figure 11:
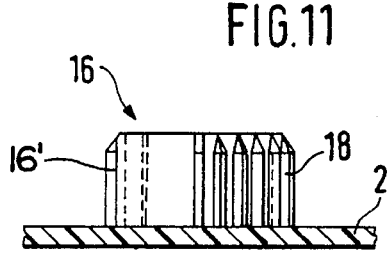
FIG. 11 is a is a front elevation of an anchoring part in the form of a ribbed bolt according to an alternative preferred embodiment of the invention.

A two-part fastening system according to the invention is suitable for securing a wide range of items together. The two-part system includes an anchoring part and a fastening member which are pressed together into engagement. Shown in FIGS. 1 to 3 is an anchoring part 1 in accordance with a first preferred embodiment of the invention. The anchoring part 1 includes a webbed plate 1' which extends perpendicularly to a support plate or carrier plate 2 which may be attached to any object. The anchoring part 1 is injection-molded from a relatively soft thermoplastic synthetic material. The webbed plate 1' is provided with a plurality of ribs 3, which extend parallel to one another on opposite sides of the webbed plate 1'. Each rib 3 has a blunt outer end 3' and extends outwardly from a rib base 3". The outer ends 3' of each side of the webbed plate 1' extend along a plane which is perpendicular to the carrier plate 2.

As shown in FIG. 3, the outer ends 3' of opposed pairs of ribs are spaced apart a distance "D" and opposed pairs of rib bases 3" are spaced apart a distance "d". On an upper edge 15 of the webbed plate 1' there is provided a flat recess 13.

Shown in FIGS. 4 to 6, is the fastening member which is in the form of a fastening body of hard elastic synthetic material and can be integrated into any type of holding member. The fastening body 4 has a U-shaped form with two spaced apart clamping walls 5 extending parallel to each other. The clamping walls 5 are joined at one end by a cross wall 6. The clamping walls form an opening 7 at their opposite ends. The opening 7 extends from a bottom 11 to the full height of the clamping walls 5 to receive the webbed plate 1' of the anchoring part. The clamping walls 5 are joined together above the opening 7 by a crosspiece 8 which is provided to stabilize the clamping walls 5.

A plurality of sharp-pointed projections 9 are spaced apart one over another on each of the clamping walls. The projections 9 are aligned to extend parallel with the bottom 11. As shown in FIGS. 5, 7, 8 and 9, the projections are formed to transversely intersect the ribs 3 when the webbed plate 1' is pressed into the fastening body 4 and in the process dig at least part way into the ends 3'. Each projection 9 has a ledge 12 which extends perpendicularly from the clamping wall 5 to meet an underside portion at an acute angle, thereby forming a sharp pointed edge 9'. The edges 9' of each clamping wall 5 are spaced apart a distance "a".

As shown in FIGS. 5 and 6, the fastening member includes a pair of outwardly directed oblique insertion walls 10. The insertion walls 10 are formed on either side of the opening 7 to center the webbed plate 1' between the clamping walls 5. The edges 9' of the projections 9 are similarly beveled on either side of the opening 7.

As best shown in FIGS. 5, 6, and 8, a locking finger 14 is molded to a back side of the crosspiece 8 to extend downwardly between the clamping walls 5. The locking finger 14 is formed to be resiliently displaceable so as to permit insertion of the webbed plate 1' and engage recess 13 of the webbed plate 1', as best shown in FIG. 8.

As shown in FIGS. 3 and 5, the distance "a" between the edges 9' of the projections 9 is less than the width "D", measured from the ends 3' of the ribs 3 and greater than the thickness of the webbed plate 1' measured at the rib base 3". In this manner, the projections 9 will cut into the ribs 3 when the webbed plate 1' is pressed into the clamping walls 5.

As shown in FIG. 7, the fastening body 4 is affixed to the anchoring part 1 by sliding the fastening body 4 along the support plate 2 in the direction of arrow "P" onto the webbed plate 1'.

As best shown in FIGS. 8 to 10, the sharp edges 9' of the projections 9 dig into the rib ends 3' of the webbed plate 1' to connect the fastening body 4 to the anchoring part. As shown in FIG. 8, the locking finger 14 is received in the upper recess 13 of the webbed plate 1' to prevent unintentional removal of the anchoring part. Thus, once the locking finger 14 engages the recess 13 of the webbed plate 1' the anchoring part 1 and fastening body 4 are securely held together and can be released only by lifting the finger 14 from the recess 13 of the webbed plate 1'.

Figure 12:
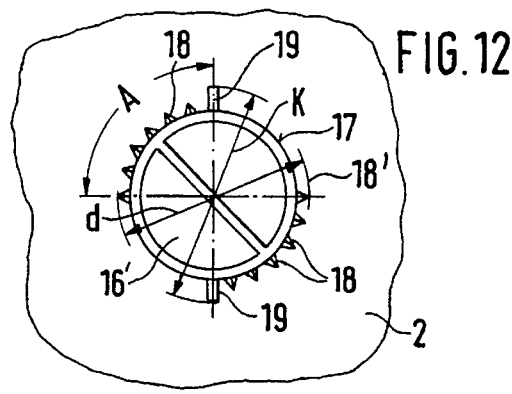
FIG. 12 is a plan view of the ribbed bolt according to the alternative preferred embodiment of the invention.

As shown in FIGS. 11 and 12, an alternative preferred embodiment of the two-part fastening system includes an anchoring part 16 having a bolt portion 16' extending at a right angle with a support plate 2. The anchoring part 16 is formed of a relatively soft thermoplastic synthetic material. The bolt 16' has an outer cylindrical surface 17 with two diametrically opposed ribbed regions "A". Each of the ribbed regions "A" extends a quarter of the circumference of the cylindrical surface 17 and includes a plurality of axially parallel ribs 18. A stop rib 19 is formed at one end of each of the ribbed regions "A" such that the stop ribs 19 are offset exactly 180°. The stop ribs 19 have a diameter "K" and extend radially outwardly beyond the ribs 18.

Figure 13:
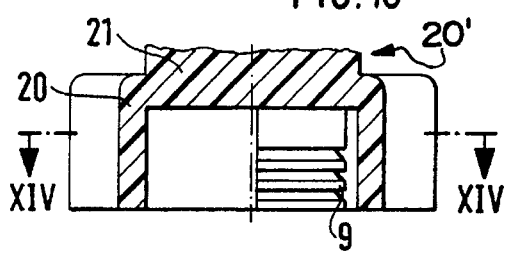
FIG. 13 is an axial sectional view of the corresponding fastening body in the form of a sleeve according to the alternative preferred embodiment of the invention.
Figure 14:
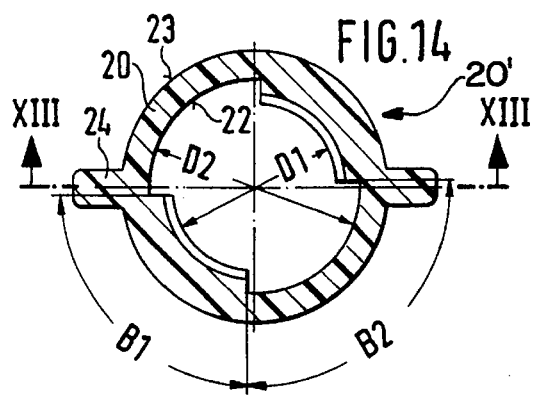
FIG. 14 is a radial sectional view of the fastening sleeve of the alternative preferred embodiment of the invention.

As shown in FIGS. 13 and 14, a fastening member 20' of the alternative embodiment includes a cylindrical sleeve 20 which is formed to engage the bolt 16'. The sleeve 20 may include a cap surface 21 or be integrated into any part or object for fastening. The sleeve 20 includes an inner wall 22 which has two quarter-arc smooth surface regions "B2". Interlying the two smooth surface regions "B2" are two engaging regions "B1" having a plurality of sharp edged projections 9 formed integrally with the sleeve and protruding radially inwardly. In the smooth surface region "B2", an inner diameter "D2" of the inner wall is greater than the outer diameter "d" of the edges 18' of the ribs 18 and is equal to or only slightly greater than the diameter "K" of the stop ribs 19. The inside diameter "D1" extending between the edges 9' of the projections 9 of the engaging regions is somewhat less than the outside diameter "d" of the rib surfaces 18' of the bolt.

Figure 16:
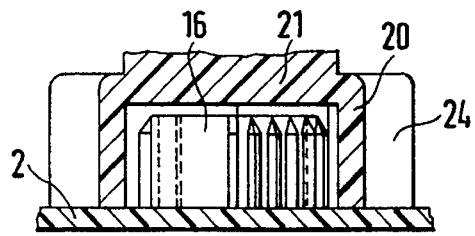
FIG. 16 is an axial sectional view of the fastening sleeve after assembly on the ribbed bolt according to the alternative preferred embodiment of the invention.
Figure 18:
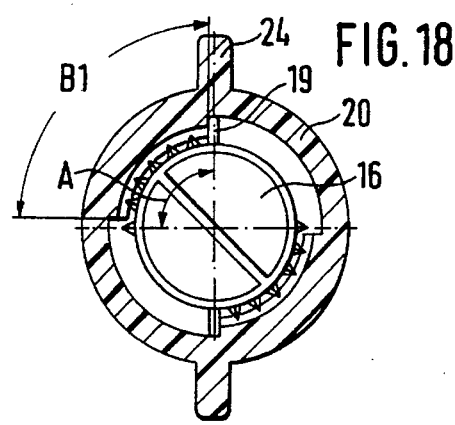
FIG. 18 is a radial sectional view of the fastening sleeve pressed on the bolt after rotation into the anchoring position according to the alternative preferred embodiment of the invention.

As shown in FIGS. 16 and 18, the sleeve 20 has an outer wall having two diametrically opposed wing tabs 24. The wing tabs are positioned in order to facilitate turning of the sleeve 20 on the anchoring part.

Figure 15:
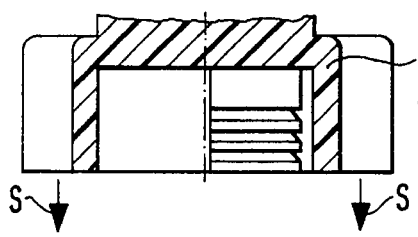
FIG. 15 is an exploded partial sectional view showing the fastening sleeve before assembly on the ribbed bolt according to the alternative preferred embodiment of the invention.

The assembly of the alternative embodiment is shown in FIGS. 15 through 18. As shown in FIG. 15, the sleeve 20 of the fastening member is aligned with the bolt 16' so that the engaging region "B1" is aligned with the ribbed region "A1" of the bolt. In this position, it is possible to press the fastening sleeve 20 axially over the bolt 16 until contacting the support plate 2.

Figure 17:
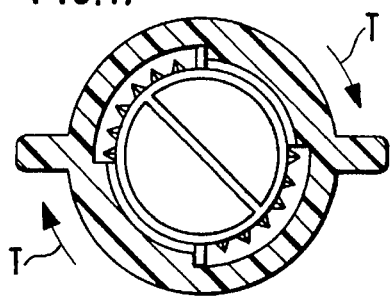
FIG. 17 is a radial sectional view of the fastening sleeve pressed on the bolt before rotation into the anchoring position according to the alternative preferred embodiment of the invention.

As shown in FIG. 17, the sleeve 20 is then rotated by means of the wing tabs 24 through an arc of 90° or a quarter turn in the direction of the arrows "T" until projections 9 of the engaging regions "B1" abut the stop ribs 19 (FIG. 18). As the fastening sleeve is rotated, the sharp edges 9' of the projections 9 engage the ends 18' of the ribs 18 and provide a firm engagement between the sleeve 20 and bolt 16'. The sleeve and bolt may be disengaged only by rotating the sleeve 90° in the opposite direction by way of the wing tabs 24 into the starting position as shown in FIG. 17.

Thus is provided a two-part fastening system which may be pressed together to securely lock the parts together. The parts may be produced in an efficient and inexpensive manner by injection molding.

Having described our invention, many modifications thereto will become apparent to those skilled in the art to which it pertains without deviation from the spirit of the invention as defined by the scope of the appended claims.

We claim:

1. A fastening system comprising:

an anchoring part formed of a first plastic material and having a plurality of parallel spaced apart ribs extending perpendicularly from a support plate; and a fastening member having a pair of spaced apart clamping walls, each of said clamping walls having at least one pointed projection for transversely engaging said ribs of said anchoring part, said fastening member being formed of a second plastic material having a predetermined hardness which is harder than a predetermined hardness of said first plastic material of said anchoring part such that said pointed projections cut into said ribs of said anchoring part.

2. The fastening system of claim 1, wherein said anchoring part further comprises a webbed plate, and said pair of clamping walls of said fastening member extend parallel to one another and are joined at one end by a cross wall, each of said clamping walls further having an opposite end positioned to define an opening for receiving said webbed plate.

3. The fastening system of claim 2, wherein said fastening member further comprises a crosspiece extending between said clamping walls adjacent said opening.

4. The fastening system of claim 2, wherein said fastening member further comprises a pair of entry walls extending obliquely to said clamping walls to facilitate insertion of said webbed plate into said fastening member.

5. The fastening system of claim 2, wherein said at least one projection of one of said pair of clamping walls is spaced a predetermined distance from said at least one projection of another of said pair of clamping walls, said webbed plate having a predetermined first width between ends of opposed pairs of ribs of said webbed plate and having a second predetermined width between opposed pairs of rib bases, such that said predetermined distance between said at least one projection is less than said first predetermined width of said ends of said pairs of ribs and greater than said second predetermined width of said opposed pairs of rib bases.

6. The fastening system of claim 2, wherein said fastening member comprises a locking finger extending obliquely downwardly between said pair of clamping walls to engage a recess formed on said webbed plate.

7. The fastening system of claim 1, wherein said anchoring part further comprises a bolt having a circumferential outer surface having a pair of diametrically opposed ribbed regions having a plurality of axially aligned ribs having a predetermined outer diameter, and said fastening member having a cylindrical sleeve having an inner wall having a pair of diametrically opposed engaging regions having pointed projections extending radially inwardly and having an inner diameter less than said outer diameter of said ribs of said bolt.

8. The fastening system of claim 7, wherein said bolt comprises a pair of diametrically opposed stop tabs, one of said tabs positioned on one end of each of said axially opposed ribbed regions, said tabs having a predetermined diameter less than said inside diameter of said inner wall of said sleeve but greater than said outer diameter of said ribs.

\* \* \* \* \*